United States Patent [19]

Toya

[11] Patent Number: 5,525,888
[45] Date of Patent: Jun. 11, 1996

[54] BATTERY CHARGER, BATTERY CASE, AND ELECTRONIC EQUIPMENT

[75] Inventor: Shoichi Toya, Mihara-gun, Japan

[73] Assignee: Sanyo Electric Co., Ltd., Osaka, Japan

[21] Appl. No.: 235,658

[22] Filed: Apr. 29, 1994

[30] Foreign Application Priority Data

May 14, 1993 [JP] Japan ..................................... 5-113080

[51] Int. Cl.⁶ ............................ H01M 10/46; H01M 2/10
[52] U.S. Cl. .................................................. 320/2; 429/98
[58] Field of Search ................................... 320/2; 429/96, 429/97, 98, 99, 100; 455/89, 90

[56] References Cited

U.S. PATENT DOCUMENTS

| | | | |
|---|---|---|---|
| 3,458,794 | 7/1969 | Bohnstedt et al. | 320/2 |
| 4,389,469 | 6/1983 | Nicholls | 429/98 |
| 4,647,832 | 3/1987 | Fenne et al. | 320/2 |
| 4,794,315 | 12/1988 | Pederson et al. | 320/2 |
| 4,857,702 | 8/1989 | Cafaro | 320/2 X |
| 5,192,904 | 3/1993 | Leiserson | 320/2 |
| 5,306,576 | 4/1994 | Sasaki | 429/98 |
| 5,306,956 | 4/1994 | Ikeda et al. | 320/2 X |
| 5,317,247 | 5/1994 | Chong et al. | 320/2 |

FOREIGN PATENT DOCUMENTS 3-167768  7/1991  Japan.

*Primary Examiner*—Peter S. Wong
*Assistant Examiner*—Patrick B. Law

[57] ABSTRACT

An integrated system of battery charger, battery case, and electronic equipment allows convenient options to carrying bulky charging equipment when traveling with portable electronic equipment. The battery charger contains both a battery pack and charging circuitry, the battery case contains multiple battery packs for extended operation time with intelligent switching to consecutively charge or discharge battery packs, and the electronic equipment operates with either the nearly identically shaped battery charger or battery case attached. Battery packs mount in a detachable fashion in compartments on either the battery charger or the battery case. Power is supplied to the electronic equipment from the battery packs through a completely compatible system of terminals and contacts on all units.

18 Claims, 7 Drawing Sheets

BATTERY CHARGER, BATTERY CASE, AND ELECTRONIC EQUIPMENT

BACKGROUND OF THE INVENTION

In order to improve the portability of portable electronic equipment such as the portable telephone and notebook computer, a battery pack containing rechargeable batteries is used as the power supply. The battery pack is either built-into the electronic equipment in a fixed manner or is attached in a removable fashion. A battery pack attached to electronic equipment in a removable fashion can be swapped for a fully charged battery pack when it has discharged. The discharged battery pack can also be detached from the electronic equipment and recharged. Finally, a detachable battery pack can easily be separated from the electronic equipment when it is disposed of. For this reason, a detachable battery pack containing a harmful substance such as cadmium has the feature that it can be disposed of separately from the electronic equipment.

Electronic equipment with a detachable battery pack can be conveniently used if the battery pack can be recharged while attached to the electronic equipment. This is because the battery pack can be recharged by setting the electronic equipment in a charging stand. Electronic equipment which realizes this feature is disclosed in Japanese Patent Publication No. 3-167768 issued in 1991.

Turning to FIGS. 6 and 7, this disclosure is illustrated by the Handy Terminal electronic equipment 72 with detachable battery pack 71 and charging stand 73. The Handy Terminal 72 in these figures is set on the charging stand 73 when not in use. When on the charging stand 73, the charging terminals (not illustrated) off the battery pack 71 are connected to the power supply terminals 74 of the charging stand 73 to recharge the battery pack 71. Consequently, when the Handy Terminal 72 is not in use, the battery pack 71 can be conveniently recharged without detachment.

For electronic equipment of this configuration, it is necessary to carry the charging stand along when traveling. This is because the charging stand is required to recharge discharged battery packs. If the charging stand is not carried along, the operating time of the electronic equipment is limited to the time to discharge the battery pack. However, carrying the bulky charging stand along with the electronic equipment is inconvenient. Often electronic equipment containing rechargeable batteries, such as the portable telephone, is used by carrying it with the user. In this case, also carrying a charging stand is extremely inconvenient. In order to lengthen electronic equipment operation time without carrying along a battery charger, large battery packs have been developed which can be substituted for small battery packs when traveling. When battery pack capacity is doubled, operating time is also doubled. However, it is difficult to estimate operating time when taking electronic equipment on a trip, and regardless of how large the battery pack is, it can still discharge completely leaving the equipment unusable. The first object of the present invention is to eliminate this drawback. Namely, a primary object of the present invention is to provide a battery charger, battery case, and electronic equipment wherein the electronic equipment can be used for long periods without carrying along a charging stand.

Further, convenience of use is achieved by allowing the battery pack to be recharged while attached to the electronic equipment or after separation from the electronic equipment. A battery pack can be recharged while attached to electronic equipment not in use, a completely discharged battery pack can be replaced with a fully charged one, and the completely discharged battery pack can then be recharged. However, realization of this configuration also requires a separate charging stand apart from the electronic equipment. For this reason, it is necessary to carry a charging stand along with the electronic equipment when traveling with the equipment. The second object off the present invention is to further eliminate this drawback. Specifically, another object of the present invention is to provide a battery charger, battery case, and electronic equipment wherein a battery pack can be recharged without carrying along the charging stand, and when necessary a battery pack can be recharged while attached to the electronic equipment or after being disconnected from the electronic equipment.

SUMMARY OF THE INVENTION

The battery charger of this invention comprises a compartment which holds a battery pack for supplying power to the electronic equipment to which it is attached, a battery pack that mounts in that compartment in a detachable fashion, a charging circuit to charge the battery pack in the compartment, and discharge terminals on the attachment plane of the battery charger to the electronic equipment for supplying power to the electronic equipment from the battery pack.

In the present invention, a battery case may be attached to the electronic equipment in place of the battery charger. The battery case of the present invention comprises compartments for a plurality of battery packs, a plurality of battery packs that mount in those compartments in a detachable fashion, discharge terminals on the battery case attachment plane to the electronic equipment for supplying power from the battery packs to the electronic equipment, and a switching means between the battery packs and the discharge terminals to successively transfer battery discharge from one battery pack to the next.

Finally, the electronic equipment, on which either the battery charger or the battery case may be mounted in a detachable manner, is provided with power terminals for connection to the discharge terminals of either the battery charger or the battery case. Either the battery charger or the battery case is selected for attachment to the electronic equipment, and power is supplied to the electronic equipment from a battery pack in a compartment of either the battery case or the battery charger through the discharge and power terminals.

DETAILED DESCRIPTION OF THE INVENTION

In the battery charger, battery case, and electronic equipment of the present invention, when the user carries the electronic equipment on a trip or such, it is carried with the battery charger attached and a charging stand is not carried along. Since the battery charger attached to the electronic equipment contains a battery pack in the battery compartment and a battery charging circuit as well, it supplies power to the electronic equipment from the battery pack and recharges the battery pack with the charging circuit when the battery pack is completely discharged. Further, since the battery pack is detachable from the battery charger, a discharged battery pack can also be replaced with a charged battery pack if necessary.

When a long period of electronic equipment use desired after a single charging, the battery case of the present invention is attached in place of the battery charger. There is no charging circuitry in the battery case. The space required for the charging circuit of the battery charger is allotted to a battery pack in the battery case. Consequently, the battery case has more battery packs than the battery charger. Since the battery case can supply power to the electronic equipment from a plurality of battery packs, it allows longer continuous use than the battery charger. For example, if the battery case has two battery packs, the electronic equipment can be used continuously for twice as long as it can be used with the battery charger. Further, since it is also preferable for the battery packs to be detachable from the battery case, the battery packs can be removed from the electronic equipment and recharged.

The electronic equipment is provided with power terminals that connect with discharge terminals on the attachment planes of the battery charger and the battery case to allow either the battery charger or the battery case to be selectively attached to the electronic equipment.

Figure 1:
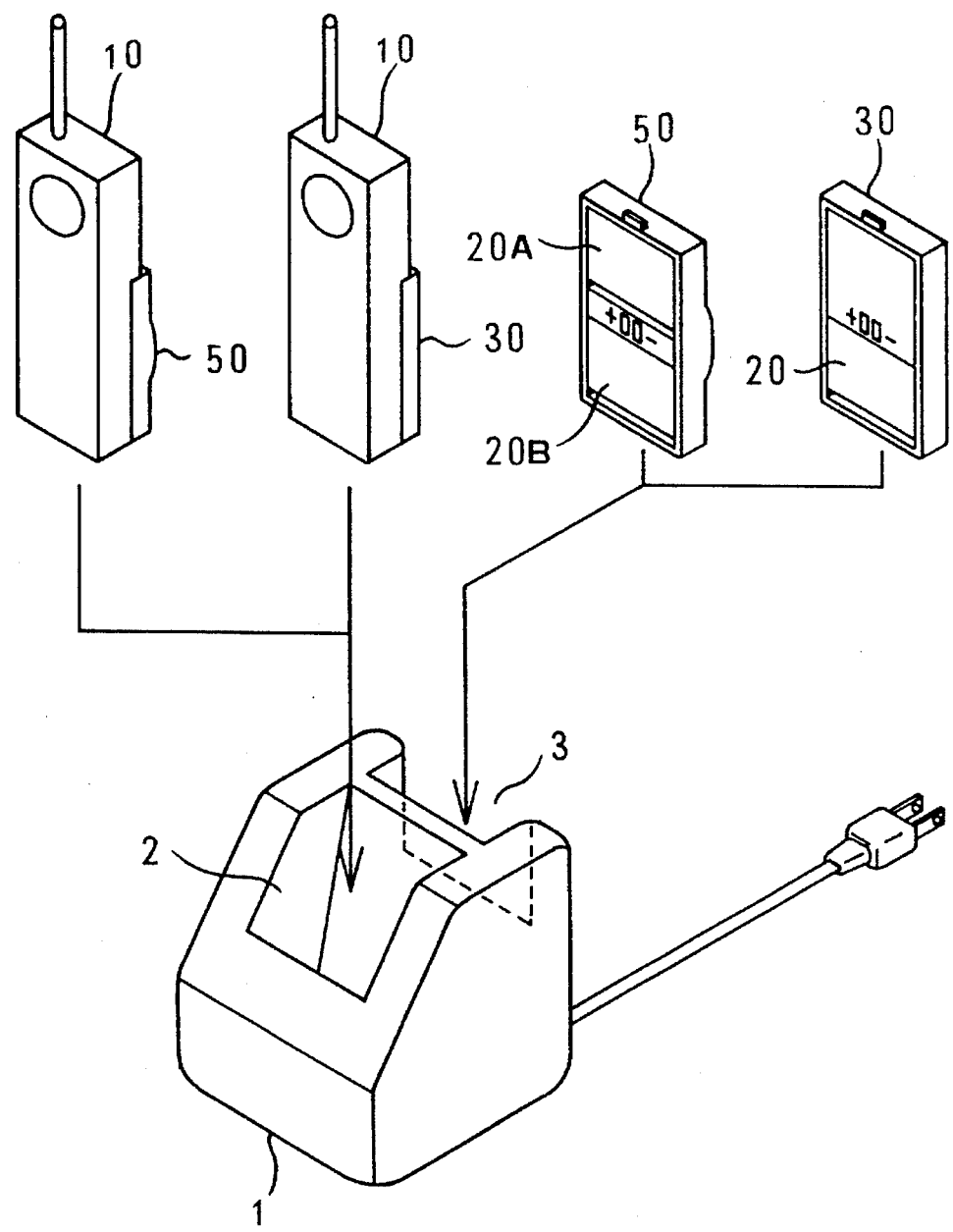
FIG. 1 is an oblique view showing the overall configuration of the present invention.

The following describes an embodiment of the present invention based on illustrations. Turning to FIG. 1, the portable electronic equipment, battery charger 30, battery case 50, and charging stand 1 of an embodiment of the present invention are shown. The charging stand 1 is provided with a first insertion slot 2 and a second insertion slot 3.

The portable electronic equipment illustrated is a portable telephone 10. The portable telephone 10 is arranged to selectively attach either the battery charger 30 which can hold one battery pack 20 (this battery pack 20 is made up of a rechargeable battery such as a nickel-cadmium or nickel-hydrogen battery) or the battery case 50 which can hold two battery packs 20A and 20B. The portable telephone 10 can be inserted in the first insertion slot 2 of the charging stand 1 with either the battery charger 30 or the battery case 50 selectively attached. Insertion in the charging stand 1 allows the battery pack 20 in the battery charger 30 or the battery packs 20A and 20B in the battery case 50 to be charged. On the other hand, either the battery charger 30 or the battery case 50 can be inserted in the second insertion slot 3 of the charging stand 1 to charge each of the battery packs 20, 20A, and 20B. It should also be noted that the battery pack 20 mounted on the battery charger 30 can obviously be charged by the battery charger 30.

The portable telephone 10 with the configuration described above can be used in exactly the same sense regardless of whether the battery charger 30 or the battery case 50 is chosen to be attached. In addition, the battery charger 30 and the battery case 50 can be treated in the same manner with regard to charging. In other words, the portable telephone 10 can be used with either the battery charger 30 or the battery case 50 attached, and the charging stand 1 can be used to charge the battery pack 20 mounted on the battery charger 30 or the battery packs 20A and 20B mounted on the battery case 50. Further, both the battery charger 30 and the battery case 50 can be set in the charging stand 1 in the same manner while attached to the portable telephone 10 to charge the attached battery packs 20, 20A, and In order to allow this same type of use for both the battery charger 30 and the battery case 50, namely the capability to charge the battery pack 20 in the battery charger 30 with the charging stand 1, the battery charger 30 of this embodiment is also provided with a pair of charging terminals 31.

Figure 2:
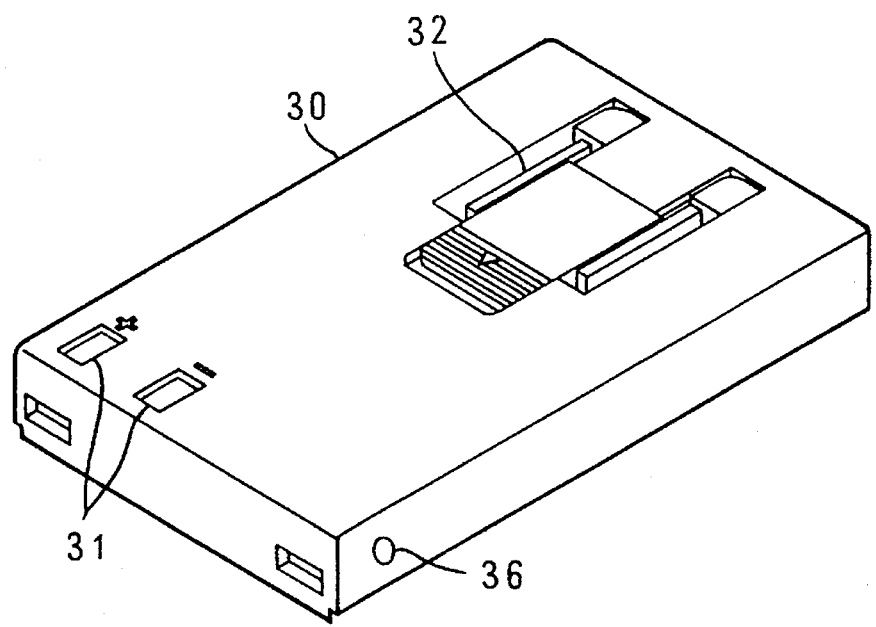
FIG. 2 is an oblique view showing a battery charger of the present invention.
Figure 2:
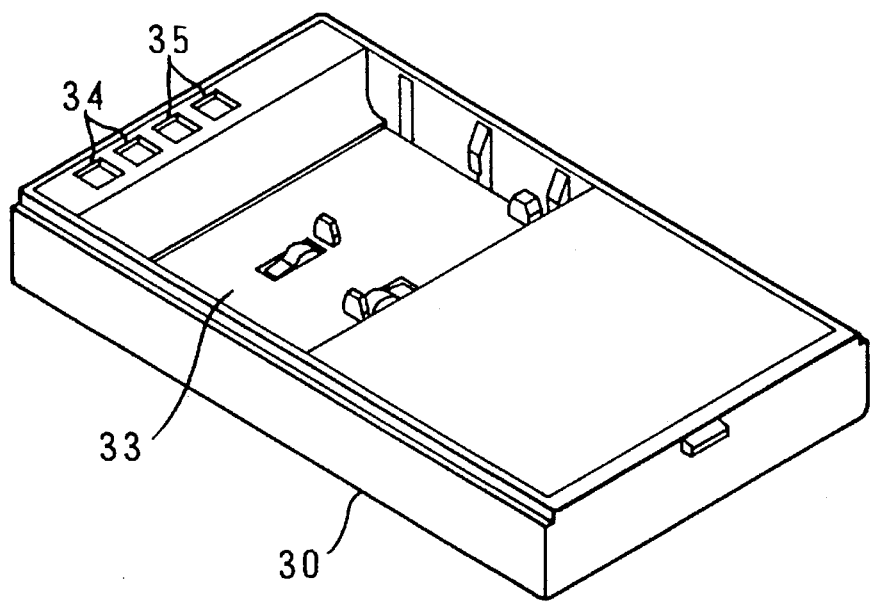

Turning to FIG. 2, an oblique view of the battery charger 30 is shown. For clarity, the upper portion of this figure shows an oblique view of the battery charger 80 as viewed from the bottom, and the lower portion shows an oblique view off the battery charger 30 as viewed from the top. The battery charger 30 in this figure has a rectangular solid shape and, as shown in the upper portion of FIG. 2, its backside is provided with a pair of charging terminals 31 and plug blades 32 which are free to rotate out from the backside. As shown in the lower portion of FIG. 2, the front side of the battery charger 30, which is the attachment plane that mates with the portable telephone, is provided with a battery pack (not illustrated) compartment cavity 33, a pair of discharge terminals 34, and a pair of communication terminals 35. Finally, as shown in the upper portion of FIG. 2, a Light Emitting Diode (LED) display 86 is provided on one side of the charger to indicate charging or completion of charging.

Figure 3:
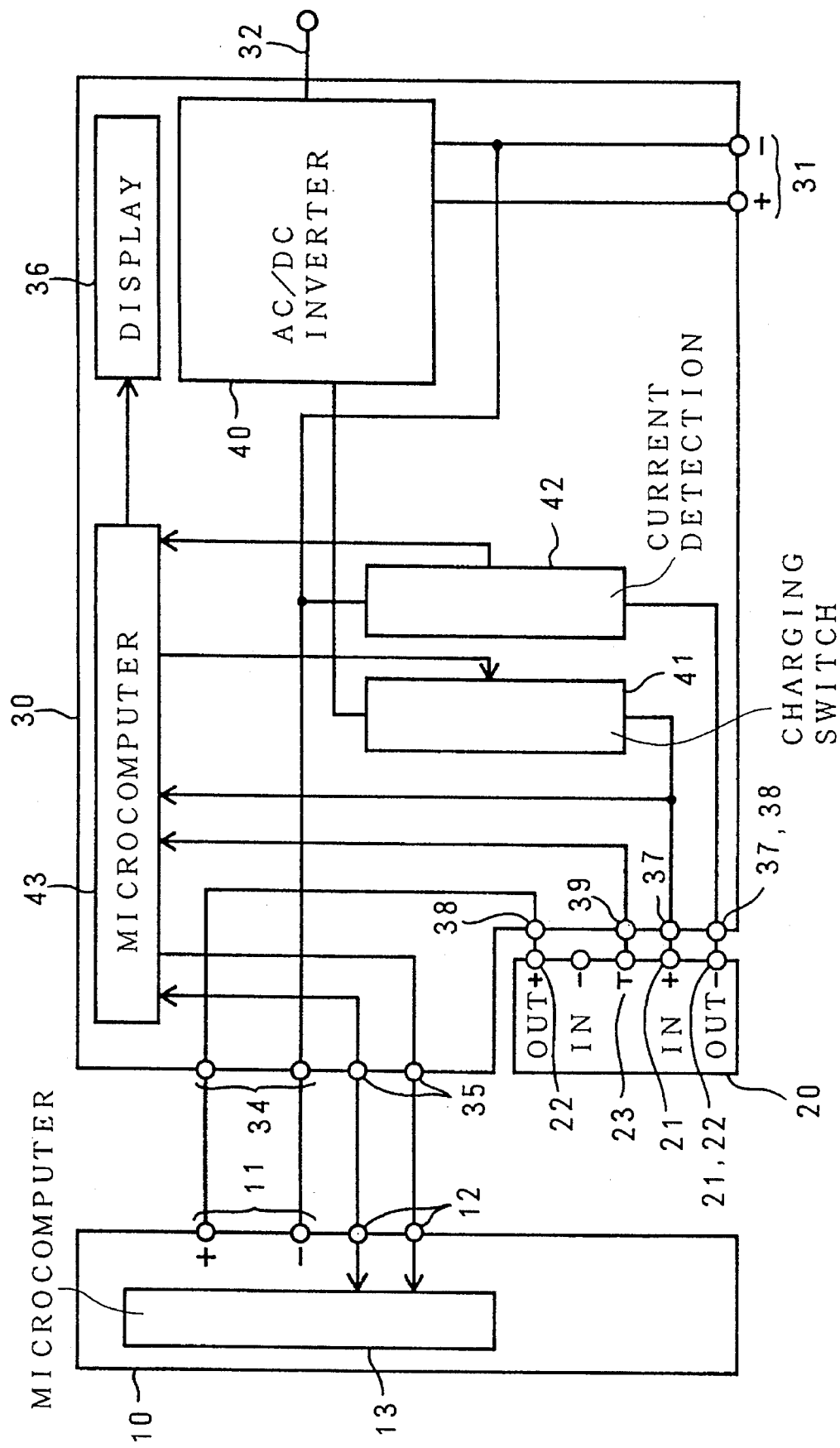
FIG. 3 is a block diagram showing circuit structure for the present invention.

FIG. 3 is a simplified block diagram showing the circuit structure of the portable telephone 10, the battery charger 30, and the battery pack 20 attached to the battery charger 30. The portable telephone 10 contains a microcomputer 13, and is provided with power terminals 11 and communication terminals 12 which connect with the discharge terminals 34 and the communication terminals 35 respectively of the battery charger 30. The battery pack 20 is provided with a pair of charging terminals 21, a pair and the discharge terminals 22 (note that the charging terminals 21 and the discharge terminals 22 have a common negative terminal), and a temperature terminal 23.

The battery charger 30 is provided with a pair of charging contacts 37 electrically connected to the charging terminals 31 or an AC/DC inverter 40 (to be described later), a pair of discharge contacts 38 electrically connected to the discharge terminals 34 (note that the charging contacts 37 and the discharge contacts 38 have a common negative terminal), and a temperature contact 39 in addition to the previously mentioned input-output terminals, namely the charging terminals 31, plug blades 32, discharge terminals 34, and communication terminals 35. These contacts 37, 38, and 39 are disposed in appropriate locations within the battery pack compartment cavity 38 to connect with the charging terminals 21, the discharge terminals 22, and the temperature terminal 23 respectively off the battery pack 20.

in the battery charger 30, the AC/DC inverter 40 converts commercial power from the plug blades 32 to the required charging current and charging voltage which is output to the charging contacts 37 via the charging switch 41. A current detection means 42 comprising a sense resistor is connected to the charging contacts 37 (and the discharge contacts 38) to determine the value off battery pack 20 charging current and/or discharge current.

The microcomputer 43 controls the on-off state of the charging switch 41, controls charging based on battery temperature from the temperature contact 39, and determines battery capacity and battery voltage based on the current detected by the current detection means 42. In addition, the microcomputer 43 shares battery information such as battery voltage and battery capacity with the portable telephone 10 microcomputer 13 through the communication terminals 35 and 12.

With this type off structure, when the battery charger 30 is attached to the portable telephone 10 with a sufficiently charged battery pack 20 mounted in the battery compartment cavity 33, battery pack 20 power is supplied to the portable telephone 10 through the discharge terminals 22, the discharge contacts 38, and the discharge terminals 34. In other words, the battery charger 30 is acting as an adapter connecting the battery pack 20 with the portable telephone 10.

At this time, battery pack 20 discharge current is measured by the current detection means 42, and the remaining battery pack 20 capacity is computed by the microcomputer 43 based on the measured results. The battery voltage of the battery pack 20 is also determined by the microcomputer 43. The microcomputer 43 subsequently sends the battery voltage remaining capacity battery information to the portable telephone 10 microcomputer 13 via the communication terminals 35 and 12. Consequently, the portable telephone 10 microcomputer 13 can compute and display information such as remaining telephone conversation time based on the battery information received.

On the other hand, in the case of battery pack 20 charging, this is accomplished without detaching the battery charger 30 from the portable telephone 10 by extending the plug blades 32 out from the battery charger 30 and inserting them into a commercial power outlet.

Figure 4:
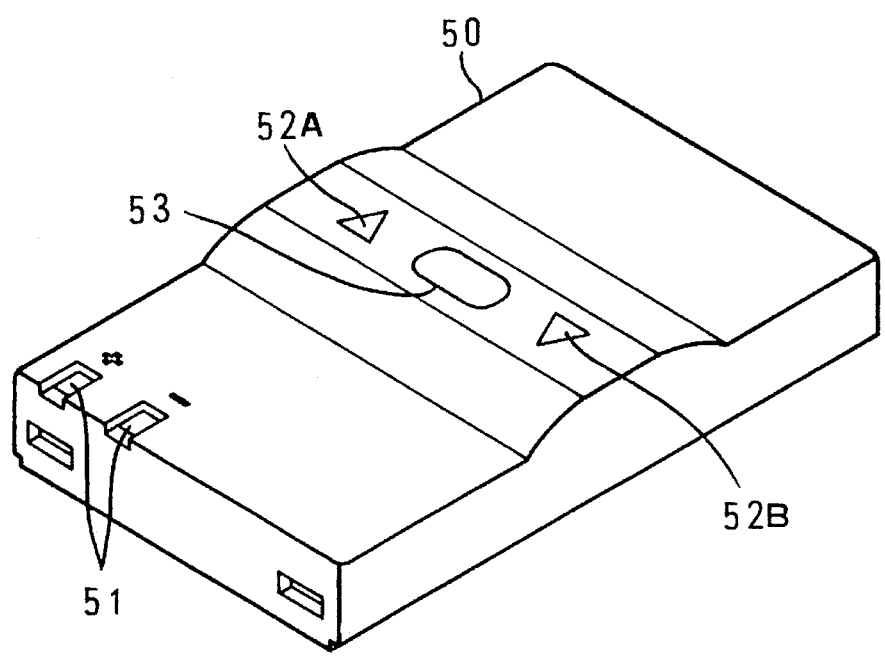
FIG. 4 is an oblique view showing a battery case of the present invention.
Figure 4:
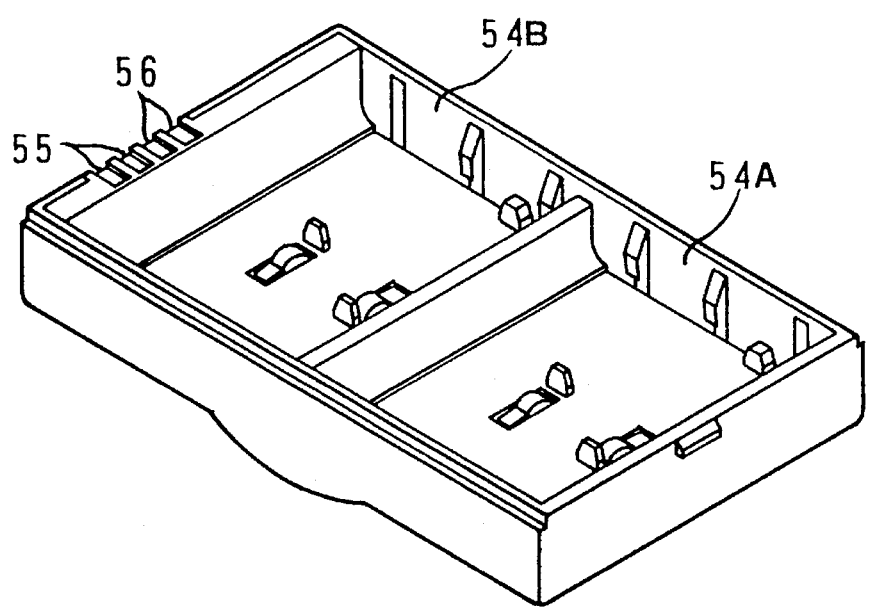

Turning to FIG. 4, an oblique view of the battery case 50 is shown. Again for clarity, the upper portion of this figure shows an oblique view as seen from the bottom, and the lower portion shows an oblique view of the battery case 50 as viewed from the top. The battery case 50 is very chose to the same rectangular solid shape as the battery charger 30 and, as shown in the upper portion of FIG. 4, is provided with a pair of charging terminals 51, two LED displays 52A and 52B, and a display switch 53 on its backside. On the front side shown in the lower portion of FIG. 4, which is the attachment plane to the portable telephone 10, battery compartment cavities 54A and 54B to hold two battery packs (not illustrated), a pair of discharge terminals 55, and a pair off communication terminals 56 are provided. Note that the charging terminals 51, the discharge terminals 55, and the communication terminals 56 are disposed in the same respective locations as for the battery charger 30.

Figure 5:
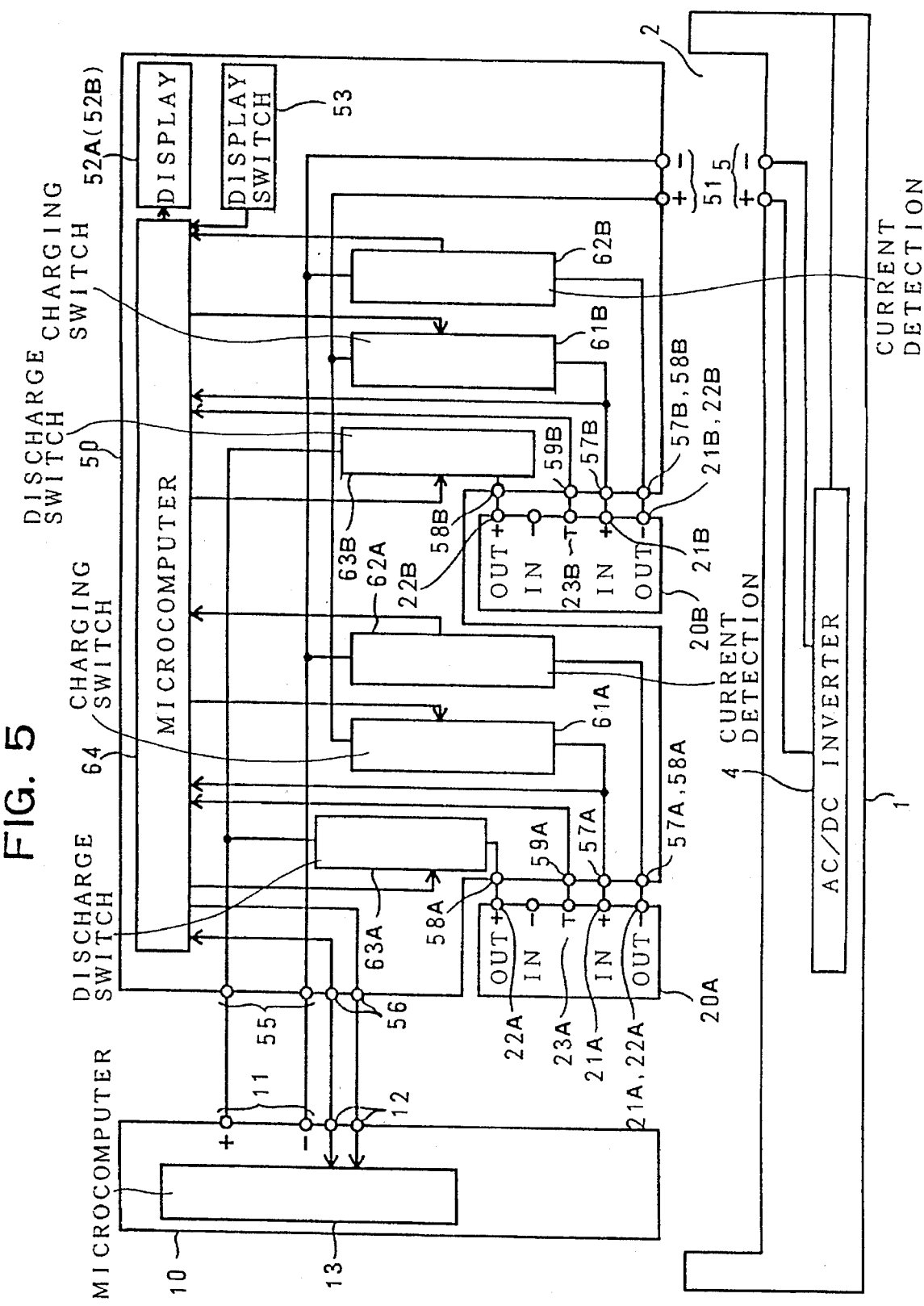
FIG. 5 is a block diagram showing circuit structure for the present invention.
Figure 6:
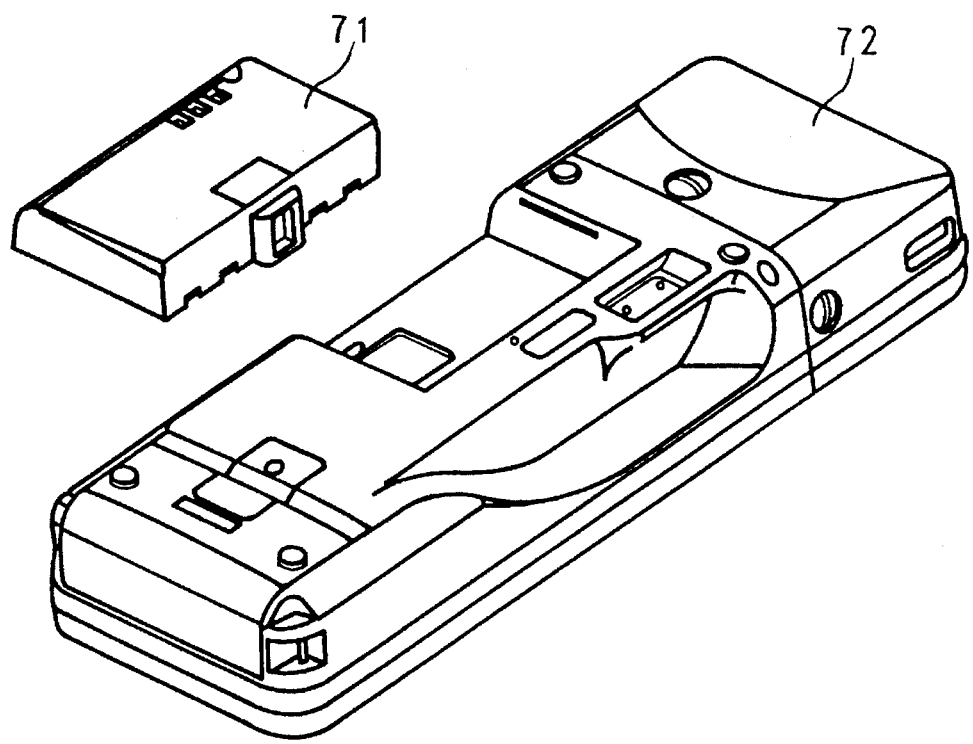
FIG. 6 is an oblique view showing an example of prior art electronic equipment.
Figure 7:
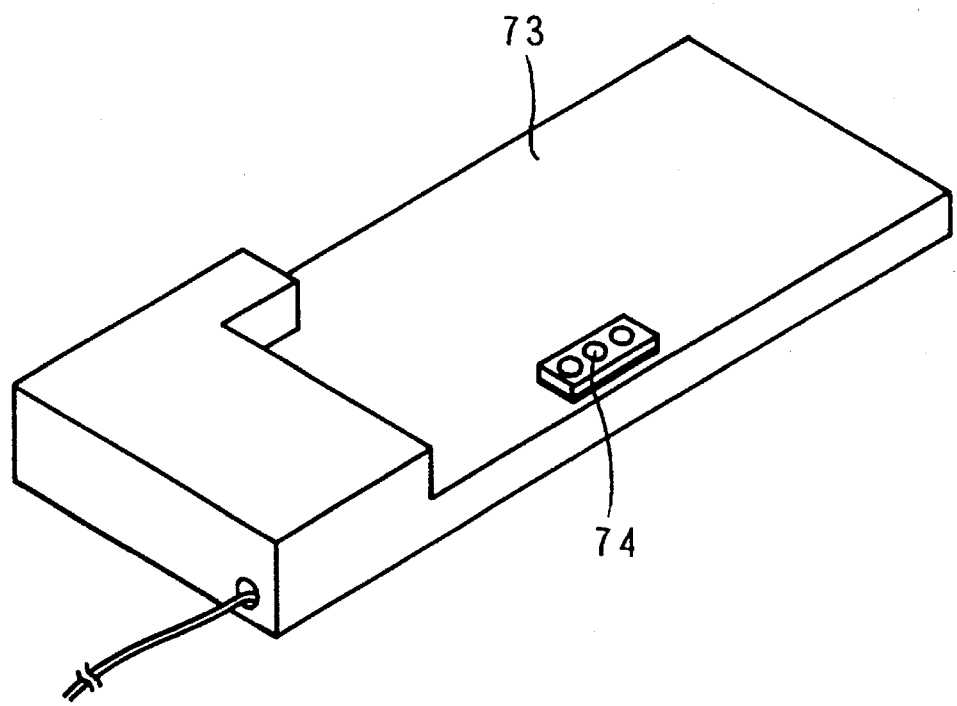
FIG. 7 is an oblique view showing the battery pack charging stand for the electronic equipment shown in FIG. 6.

FIG. 5 is a simplified block diagram showing the recruit structure of the charging stand 1, the portable telephone 10, the battery packs 20A and 20B, and the battery case 50. Here, since the battery packs 20A and 20B are the same is the previously described battery pack 20, they are designated by the same number and further explanation is omitted. The charging stand 1 contains an AC/DC inverter 4, and converts commercial power to the required charging current and charging voltage which is output from a pair of output terminals 5.

The battery case 50 is provided with two pair of charging contacts 57A and 57B connected in parallel with the charging terminals 51, two pair of discharge contacts 58A and 58B connected in parallel with the discharge terminals 55 (note that the charging contacts 57A and 57B and the discharge contacts 58A and 58B have a common negative terminal on each battery pack), and temperature contacts 59A and 59B in addition to the previously mentioned input-output terminals, namely the charging terminals 51, discharge terminals 55, and communication terminals 56. Each of these contact pairs are disposed in appropriate locations within their respective battery pack compartment cavities 54A and 54B.

The required charging current and charging voltage is supplied by the AC/DC inverter 4 off the charging stand 1 through the output terminals 5 and the charging terminals 51. This power is routed through the first charging switch 61A for output from the charging contact 57A and through the second charging switch 61B for outpost from the charging contact 57B. First and second current detection means 62A and 62B (namely, current detection resisters) are connected respectively to the charging contacts 57A (discharge contacts 58A) and to the charging contacts 57B (discharge contacts 58B), and measure the charging current and/or the discharge current of the battery packs 20A and 20B. In addition, a first discharge switch 63A and a second discharge switch 63B are provided between the discharge terminals 55 and the discharge contacts 58A and 58B respectively.

The microcomputer 64 controls the on-off state of the first and second charging switches 61A and 61B, controls the on-off state of the first and second discharge switches 63A and 63B, controls charging based on battery temperatures from the temperature contacts 59A and 59B, and determines battery capacity and battery voltage based on currents measured by the first and second current detection means 62A and 62B. In addition, the microcomputer 64 shares battery information such as battery voltage and battery capacity with the portable telephone 10 microcomputer 13 through the communication terminals 56 and 12.

With this type of structure, when the battery case 50 is attached to the portable telephone 10 with sufficiently charged battery packs 20A and 20B mounted in their respective battery compartment cavities 54A and 54B, first of all the first discharge switch 63A is turned on and battery pack 20A power is supplied to the portable telephone 10 via discharge terminals 22A, discharge contacts 58A, the first discharge switch 63A, and the discharge terminals 55.

At this time, battery pack 20A discharge current is measured by the first current detection means 62A, and the remaining battery pack 20A capacity is computed by the microcomputer 64 based on the measured results. The battery voltage of the battery pack 20A is also determined by the microcomputer 64. The microcomputer 64 subsequently sends the battery voltage and remaining capacity battery information to the portable telephone 10 microcomputer 13 via the communication terminals 56 and 12. Consequently, the portable telephone 10 microcomputer 13 can compute and display information such as remaining telephone conversation time based on the battery information received.

Next, when the remaining battery capacity of the battery pack 20A completely depletes, the microcomputer 64 turns the first discharge switch 63A of and the second discharge switch 63B on. Hence, power supplied to the portable telephone 10 from the battery pack 20B through the discharge terminals 22B, the discharge contacts 58B, the second discharge switch 63B, and the discharge terminals 55.

On the other hand, in the case of battery pack 20A and 20B charging, this is accomplished without detaching the battery case 50 from the portable telephone 10 by inserting in the first insertion slot 2 of the charging stand 1. This results in consecutive charging of battery packs 20A and 20B. In other words, when the battery case 50 attached to the portable telephone 10 is inserted into the first insertion slot 2 of the charging stand 1, first of all the first charging switch 61A is turned on to charge battery pack 20A. When this charging is complete, the first charging switch 61A is turned off and the second charging switch 61B is turned on to charge battery pack 20B.

Incidentally, the remaining capacities of battery packs 20A and 20B within the battery case 50 can be determined by pressing the display switch 53 on the battery case 50. Specifically, by pressing the display switch 53, LED 52A or 52B is turned on indicating the battery pack side available for discharge (the side with the discharge switch turned on). For example, if LED 52A is turned on, it is known that battery pack 20A is currently being discharged and battery pack 20B is fully charged. If LED 52B is turned on, it is known that battery pack 20A has completed its discharge and battery pack 20B is currently discharging.

The battery charger described above is provided with a compartment to hold a rechargeable battery pack, a charging circuit to charge the rechargeable battery pack, and rechargeable battery pack discharge terminals disposed on the attachment plane to the electronic equipment body. The battery case is provided with compartments to hold a plurality of rechargeable battery packs, rechargeable battery pack discharge terminals disposed on the attachment plane to the electronic equipment body, and a switching means between the rechargeable battery packs and the discharge terminals to systematically switch from discharging one rechargeable battery pack to the next. Finally, the electronic equipment constitutes the electronic equipment body, the battery charger which can hold a rechargeable battery pack, and the battery case which can hold a plurality of rechargeable battery packs, wherein either the battery charger or the battery case can be selectively attached to the electronic equipment body. Consequently, an extremely convenient to use battery charger, battery case, and electronic equipment can be provided.

We claim:

1. A battery case comprising;
   (a) a casing having a plurality of compartments and an attachment plane;
   (b) a plurality of battery packs detachably mounted in the compartments of said casing;
   (c) discharge terminals, disposed on the attachment plane of said casing, for supplying power discharged from said battery packs to electronic equipment to which said casing is attached;
   (d) a switching means disposed between said battery packs and said discharge terminals for sequentially discharging said battery packs; and
   (e) charging terminals for charging said battery packs.

2. A battery case as recited in claim 1, further comprising charging switches provided between said battery packs and said charging terminals to sequentially charge said battery packs.

3. A battery case as recited in claim 1, wherein an external shape of said casing is essentially the same as a battery charger.

4. An apparatus comprising a battery charger and battery case,
   said battery charger comprising,
   (a) a first battery pack for supplying power to electronic equipment to which the battery charger is attached;
   (b) a first casing having an attachment plane and a compartment in which said first battery pack is detachably mounted;
   (c) a charging circuit including first charging terminals for charging said first battery pack;
   (d) first discharge terminals, disposed on the attachment plane of said first casing, for supplying power discharged from first battery pack to the electronic equipment;
   said battery case comprising,
   (a) a second casing having an attachment plane and a plurality of compartments;
   (b) a plurality of second battery packs detachably mounted in the compartments of said second casing;
   (c) second discharge terminals, disposed on the attachment plane of said second casing, for supplying power discharged from said second battery packs to electronic equipment to which the battery case is attached;
   (d) a switching means disposed between said second battery packs and said second discharge terminals of said battery case for sequentially discharging said second battery packs; and
   (e) second charging terminals for charging said second battery packs.

5. An apparatus as recited in claim 4, further comprising third charging terminals connected to said first battery pack for charging said first battery pack separately from said first charging terminals of said charging circuit.

6. An apparatus as recited in claim 4, further comprising electrical outlet plug blades connected to said charging circuit of said battery charger and extractably mounted on said first casing of said battery charger.

7. An apparatus as recited in claim 4, further comprising charging switches provided between said second battery packs and said charging terminals of said battery case to sequentially charge said second battery packs.

8. An apparatus as recited in claim 4, wherein said battery charger and said battery case have essentially the same external shape.

9. An apparatus as recited in claim 4, wherein said discharge terminals of each of said battery charger and said battery case are provided in essentially coincident locations.

10. An apparatus as recited in claim 4, wherein said charging terminals of said battery charger and said battery case are provided in essentially coincident locations.

11. An apparatus comprising a battery charger, battery case, and charging stand,
    said battery charger comprising,
    (a) a first battery pack;
    (b) a first casing having an attachment plane and a compartment in which said first battery pack is detachably mounted;
    (c) a charging circuit for charging said first battery pack;
    (d) discharge terminals, disposed on the attachment plane of said first casing, for supplying power discharged from said first battery pack to electronic equipment;
    (e) charging terminals for charging said first battery pack;
    said battery case comprising,
    (a) a second casing having an attachment plane and a plurality of compartments;
    (b) a plurality of second battery packs detachably mounted in the compartments of said second casing;
    (c) discharge terminals, disposed on the attachment plane of said second casing, for supplying power discharged from said second battery packs to the electronic equipment;
    (d) a switching means disposed between said second battery packs and said discharge terminals of said battery case for sequential discharging said second battery packs; and (e) charging terminals for charging said second battery packs;

said charging stand comprising,
(a) an insertion slot for inserting either one of said battery charger and said battery case;
(b) output terminals, which connect with said charging terminals of said either one of said battery charger and said battery case inserted in said insertion slot, for supplying a charging current to said charging terminals; and
(c) a power supply circuit for converting an input power into the charging current output from said output terminals.

12. An apparatus as recited in claim 11, wherein the power supply circuit is an AC/DC converter which converts commercial power into the charging current output from said output terminals.

13. An apparatus as recited in claim 11, further comprising electrical outlet plug blades connected to the charging circuit of said battery charger and mounted on said first casing in an extractable manner.

14. An apparatus as recited in claim 11, further comprising charging switches provided between said second battery packs and said charging terminals of said battery case to sequentially charge said second battery packs.

15. An apparatus as recited in claim 11, wherein said battery charger and said battery case have essentially the same external shape.

16. An apparatus as recited in claim 11, wherein said discharge terminals of each of said battery charger and said battery case are provided in essentially coincident locations.

17. An apparatus as recited in claim 11, wherein said charging terminals of each of said battery charger and said battery case are provided in essentially coincident locations.

18. An apparatus as recited in claim 11, wherein said charging stand includes another insertion slot for inserting the electronic equipment having either one of said battery charger and said battery case attached thereto.

* * * * *